March 14, 1961  W. G. BAIRD, JR  2,974,370
COPIES AND METHOD FOR MAKING THE SAME
Filed Jan. 14, 1959
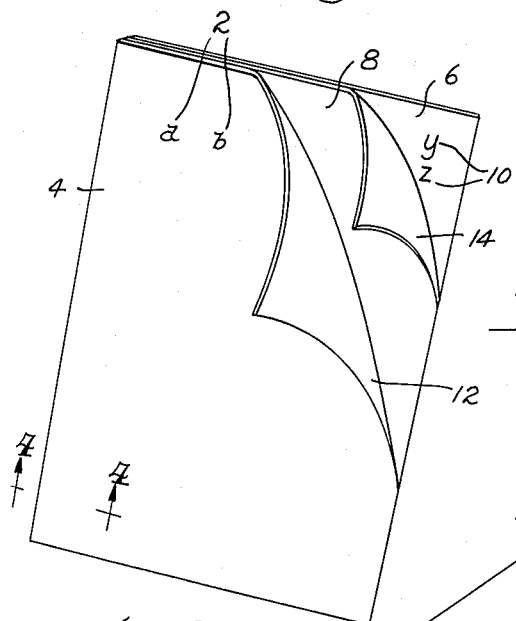
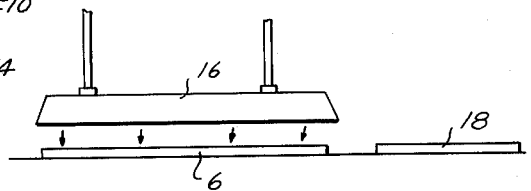
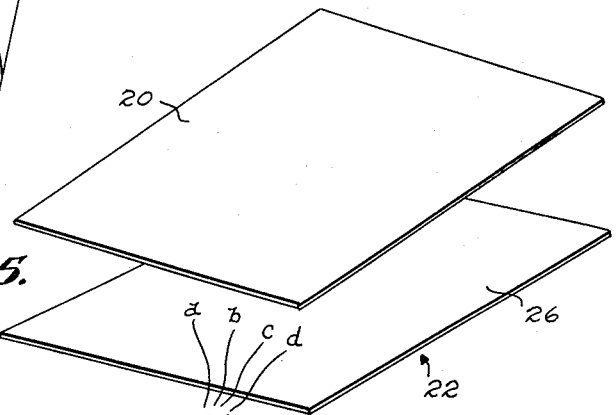
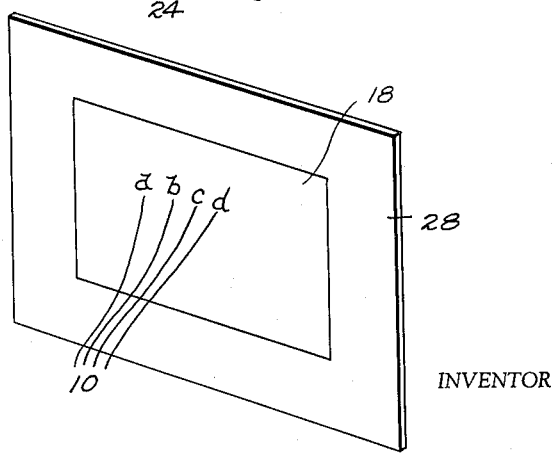
INVENTOR
WILLIAM G. Baird, Jr.
BY Cushman, Darby & Cushman
ATTORNEYS United States Patent Office 2,974,370
Patented Mar. 14, 1961

2,974,370
COPIES AND METHOD FOR MAKING THE SAME
William G. Baird, Jr., Winchester, Mass., assignor to W. R. Grace & Co., Cambridge, Mass., a corporation of Connecticut
Filed Jan. 14, 1959, Ser. No. 786,875
20 Claims. (Cl. 18—47.5)

The present invention relates to the preparation of copies of original documents.

The preparation and storage of copies of original documents is increasingly becoming a problem. If the copies are the same size as the original, there is the problem of finding adequate storage space. In an attempt to overcome this problem, many organizations make microfilms of original documents and thereby reduce considerably the storage space required for the copies. However, the use of microfilm entails the use of the relatively expensive photographic processes, as well as the problems entailed in employing solutions of chemicals which might spill, etc. Furthermore, relatively skilled labor is required to make microfilms, and it is necessary for many organizations to send material which is to be microfilmed to outside companies for this purpose.

Other procedures for making copies suffer from the disadvantage that the copies take up little or no less space than the original. Furthermore, many of the procedures use materials which deteriorate excessively with age.

It is an object of the present invention to make permanent copies of documents, e.g. letters, books, magazines, and other printed publications, etc.

Another object is to prepare copies of such documents with a considerable saving in space.

A further object is to prepare copies of such documents of a reduced size while at the same time eliminating the disadvantages inherent in the prior art photographic processes.

An additional object is to prepare clearly readable reduced copies of documents.

Yet another object is to protect the indicia present on such reduced copies.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by simultaneously applying indicia to an original sheet and a second sheet, the second sheet being made of a shrinkable plastic, and thereafter shrinking the second sheet. The indicia can be applied to the original sheet by writing, typing, printing or other form.

The invention will be better understood in connection with the accompanying drawing wherein:

Figure 1 is a perspective view showing one form of the invention wherein an original sheet, a carbon paper, and a heat shrinkable plastic second sheet are employed.

Figure 2 is a sectional elevation schematically showing the technique for shrinking the second sheet of Figure 1.

Figure 3 is a longitudinal elevation of the original document, carbon paper and second sheet of Figure 1.

Figure 4 is a section on the line 4—4 of Figure 1.

Figure 5 is an exploded perspective view of a second sheet according to the invention having a protective covering thereon.

Figure 6 shows a slide made from a shrunken second sheet according to the invention.

Figure 7 is a side elevation showing a manner of assembling a plurality of second sheets together.

Referring more specifically to Figure 1 of the drawings, indicia 2 are applied to an original sheet 4, e.g. by typing on paper. There is also provided a second sheet 6 made of a heat shrinkable plastic, specifically biaxially oriented polyethylene having a shrink energy of 250 p.s.i. at 96° C. (The biaxially oriented polyethylene was prepared by irradiating Alathon 14 to a dosage of 12 megarad and then stretching 350% in both directions.)

In between the original sheet 4 and the second sheet 6, there is provided a carbon paper 8, so that the indicia on the original sheet will appear as corresponding indicia 10 on the second sheet 6. The carbon paper or other reproducing media can be dispensed with when there are employed means whereby the indicia applied to the first sheet can be applied simultaneously to the second sheet. As indicated by the folded back edge 12 of the original sheet and folded back edge 14 of the carbon paper, the second sheet 6 is separated from the carbon paper and original sheet. The second sheet 6 is then positioned under hot air heater 16 as shown in Figure 2 and reduced to a desired size sheet 18. The final size of the sheet 18 may be determined by controlling the amount of heat applied by the heater 16 to sheet 6. Alternately, the final size of sheet 18 may be determined by application of controlled restraint to the periphery of sheet 6. In practice, it has been found that the size of sheet 6 can be reduced to that of conventional microfilm without any significant distortion of the indicia, i.e., the indicia retain their original clarity. The reduced sheet can subsequently be read directly or in the event that the reduction in size is such that the indicia cannot be made out by the naked eye, then a magnifying glass or any other conventional magnifying apparatus such as that used with microfilm can be employed.

While the preferred heat shrinkable plastic employed in the present invention is irradiated biaxially oriented polyethylene, there can be employed other heat shrinkable plastics such as unirradiated biaxially oriented polyethylene, biaxially oriented Saran (vinylidene chloride resin), biaxially oriented polyethylene terephthalate film (Mylar), biaxially oriented styrene, biaxially oriented polypropylene film, biaxially oriented nylon (e.g. synthetic linear polyamides such as polyhexamethylene adipamide), etc. While it is possible to use monoaxially oriented heat shrinkable plastics, the results obtained are not normally as satisfactory since there will be distortion as shrinkage will occur in only one direction. Moreover, it is not possible to get as complete a shrinkage with monoaxially oriented heat shrinkable film.

Since some printing inks do not adhere too well to polyethylene, to avoid any danger of smudging or removal of such inks, a protective film 20 of the irradiated biaxially oriented polyethylene can be placed over a similar irradiated biaxially oriented polyethylene sheet 22 having indicia 24 on the upper surface 26 thereof, as shown in Figure 5. Sheet 22 is one which was used as a second sheet as shown in Figure 1, and the carbon paper was removed prior to positioning the protective film 20 over sheet 22. After positioning film 20 over sheet 22, heat can be applied to simultaneously shrink both of them, and the indicia will then be protected from possible smudging or removal. Protective film 20 and sheet 22 can be adhered together in any known manner, e.g. by treating the surfaces which are to come in contact with a corona discharge or by shrink sealing procedures, etc.

It is also possible to apply the protective film after shrinking the second sheet.

As shown in Figure 6, the shrunken polyethylene film 18 having indicia 10 thereon can be inserted in a frame 28 in the same manner as is conventionally done in forming slides from color pictures or photomicrographs. The indicia 10 can be protected by an overlying clear film such as the film 20 of Figure 5, if desired. When a clear protective film is employed, it can be made from either shrinking or nonshrinking material.

Furthermore, individual second sheets 30 can be adhered together by overlapping as at 32 in Figure 7 to form a continuous shet which can be wound into a roll to conserve space in storage. The adherence at the overlaps 32 can be done by treatment of the surfaces with corona discharge prior to contact or by the use of shrink sealing procedures or by the use of adhesives.

In general, there is employed in the invention polyethylene film or tubing which has been irradiated to an extent of 2 to 100 megarad, preferably 6 to 20 megarad. The irradiation can be accomplished in conventional fashion, e.g. by the use of a high voltage resonant transformer, such as the 2,000,000 volt General Electric resonant transformer, or high energy particle generators of 50,000 to 50,000,000 volts or a Van de Graaff electron generator. In addition to the use of electrons there can be employed beta rays, gamma rays, e.g. by employing cobalt 60, etc. There can be employed any of the irradiation procedures disclosed in Baird application, Serial No. 713,848, filed February 7, 1958, for example. The entire disclosure of the Baird application is hereby incorporated by reference.

The biaxial orientation is normally carried out to an extent of 100 to 700% longitudinally and 100 to 900% laterally. The biaxial stretching can be carried out by blowing irradiated polyethylene tubing as disclosed in the Baird application. The irradiated biaxially oriented polyethylene prepared by such a procedure has a high shrink energy, e.g. 100 to 500 p.s.i. at 90° C.

There can be employed as the starting polyethylene for the irradiation procedure high, low or medium density polyethylene prepared by low or high pressure technique. The starting polyethylene can have a molecular weight of 7,000 or 12,000 or 19,000 or 21,000 or 24,000 or 35,000 or even higher.

In place of irradiated polyethylene there can be employed similarly irradiated polypropylene.

The reduced indicia have remarkable clarity and can frequently be read in such form. However, they can be enlarged, if desired, by conventional enlarging apparatus for convenient reading.

What is claimed is:

1. A method comprising simultaneously applying indicia to an original sheet and a second sheet indicia on second sheet being copies of those on the original sheet and resulting from the step of applying said indicia to said original sheet, said second sheet being made of a shrinkable plastic, and thereafter shrinking said second sheet to preserve the indicia in reduced size.

2. A method according to claim 1 wherein said second sheet is of a heat shrinkable plastic and the shrinking is accomplished by the application of heat.

3. A method according to claim 2 wherein said original sheet and said second sheet are separated prior to shrinking said second sheet.

4. A method according to claim 3 wherein a reproducing media is between said first and said second sheets.

5. A method according to claim 4 wherein said reproducing media is removed prior to shrinking said second sheet.

6. A method according to claim 5 wherein said reproducing media is carbon paper.

7. A method according to claim 2 wherein said heat shrinkable plastic is heat shrinkable polyethylene.

8. A method according to claim 7 wherein said original sheet and second sheet are separated prior to shrinking said second sheet.

9. A method according to claim 8 wherein said reproducing media is carbon paper and the carbon paper is removed prior to shrinking said second sheet.

10. A method according to claim 2 wherein said heat shrinkable plastic second sheet is heat shrinkable, biaxially oriented polyethylene having a shrink energy of at least 100 p.s.i.

11. A method according to claim 10 wherein a clear plastic film is placed over said polyethylene having the indicia thereon to protect the indicia.

12. A method according to claim 10 comprising placing a clear heat shrinkable plastic over said second sheet having the indicia thereon to protect the indicia and then simultaneously shrinking said clear shrinkable polyethylene and said second sheet.

13. A method according to claim 12 wherein said clear, heat shrinkable plastic is clear, heat shrinkable, biaxially oriented polyethylene.

14. A shrunken sheet of material having indicia thereon made by the method of claim 1.

15. A method according to claim 2 wherein said heat shrinkable plastic second sheet is heat shrinkable, irradiated, biaxially oriented polyethylene having a shrink energy of 100 to 500 p.s.i.

16. A method comprising simultaneously applying indicia to an original sheet and a second sheet indicia on second sheet being copies of those on the original sheet and resulting from the step of applying said indicia to said original sheet, said second sheet being made of a heat shrinkable, biaxially oriented plastic which has been stretched at least 100% in each direction, and thereafter shrinking said second sheet to preserve the indicia in reduced size.

17. A method according to claim 16 wherein a reproducing media is positioned between said first and said second sheets.

18. A method according to claim 17 wherein the biaxially oriented plastic is stretched at least 350% in each direction.

19. A method according to claim 16 wherein the biaxially oriented plastic is heat shrinkable polypropylene.

20. A method according to claim 1 wherein said second sheet is reduced to microfilm size.

References Cited in the file of this patent

UNITED STATES PATENTS

| | | |
|---|---|---|
| 2,237,567 | Land | Apr. 8, 1941 |
| 2,502,240 | Wiley | Mar. 28, 1950 |
| 2,533,609 | Nolan et al. | Dec. 12, 1950 |
| 2,784,456 | Grabenstein | Mar. 12, 1957 |
| 2,877,500 | Rainer et al. | Mar. 17, 1959 |